United States Patent
Rouxel et al.

[15] 3,644,719
[45] Feb. 22, 1972

[54] TIME DELAY COMPENSATION IN A CLOSED-LOOP PROCESS CONTROL SYSTEM

[72] Inventors: Roland Rouxel, Seyssinet; Gabriel Chevalier, Grenoble, both of France

[73] Assignee: Societe Generale de Constructions Electriques et Mecaniques, Paris, France

[22] Filed: Mar. 3, 1970

[21] Appl. No.: 16,212

[30] Foreign Application Priority Data

Mar. 3, 1969 France..................................6905752

[52] U.S. Cl..........................................235/150.1, 318/561
[51] Int. Cl..................................................G05f 11/01
[58] Field of Search..............................235/150.1; 318/561

[56] References Cited

OTHER PUBLICATIONS

" A Controller to Overcome Dead Time" by Smith, ISA Journal, February 1959, Vol. 6, No. 2 pages 28– 33.

*Primary Examiner*—Eugene G. Botz
*Attorney*—Arthur O. Klein

[57] ABSTRACT

The deleterious effect of time lag in an industrial process on the operation of a closed-loop feedback control system in which such process is regulated may be substantially eliminated without sacrificing static accuracy of the system by a specially designed process controller. The controller includes an input and an output network connected in tandem in the main path of the feedback loop through one input of a first subtracter. The controller output is coupled to one input of a second subtracter through an additional network whose transfer function is equal to the product of the input network transfer function and the equivalent unretarded transfer function of the controlled process. The output of the additional network is also coupled to the other input of the second subtracter through a retardation circuit having the same delay characteristics as that of the process. The output of the second subtracter is connected to the second input of the first subtracter to provide the required process control signal from the output network.

11 Claims, 17 Drawing Figures

TIME DELAY COMPENSATION IN A CLOSED-LOOP PROCESS CONTROL SYSTEM

BACKGROUND OF THE INVENTION

Many industrial processes are regulated by feedback control systems wherein the response of the process in suitably sampled and compared with a command to the system to generate an input error signal. The input error signal in turn drives a controller which provides the required process control signal.

Many such controlled processes exhibit a substantial time delay between the application of the control signal thereto from the controller and the desired response of the process. The effect of such unwanted time delays on feedback systems whose controllers employ the usual types of proportional-derivative-integral control is a more oscillatory and unstable system response. While it is true that such added instability may be corrected in part by reducing the overall gain of the feedback system, such reduction in gain leads inevitably to a corresponding reduction in static accuracy which may prove intolerable in the regulation of the particular process in question.

SUMMARY OF THE INVENTION

A more advantageous way of compensating for system instabilities due to time lags in the regulated process without a corresponding reduction in static accuracy of the system is provided with the arrangement of the present invention. The controller supplying the regulating signal for the process includes a first network whose input is coupled to the input error signal and whose output is coupled to a first subtracter. The controller output terminal is coupled to a first input of a second subtracter through a second network whose transfer function is the product of the transfer function of the first network and the effective unretarded transfer function of the process. The output of the second network is also coupled to a second input of the second subtracter through a retarding circuit whose transfer function is equal to the effective retardation transfer function of the process. The output of the second subtracter is applied to the second input of the first subtracter. A third network is coupled to the output of the first subtracter for converting such output into the process control signal which includes a component that cancels the effective retardation portion of the process transfer function.

In an illustrative embodiment, in which the transfer function of the process is empirically determined to be of the form $K_o \div (1+pT_o)$ multiplied by a retardation function, where $p$ is the LaPlace operator, the first network has a linear transfer function $1/K_o$; the second network has a transfer function $1/pT_o$; and the third network operates on the output of the first subtracter by another linear factor to form the process-regulating signal.

Additionally, suitable facilities may be provided in at least the second network and its associated components (i.e., the retardation circuit and the second subtracter) for processing the associated signals in N-bit digital form to reduce the size and bulk of the apparatus.

BRIEF DESCRIPTION OF THE DRAWING

The nature of the invention and its advantage will appear more fully from the following detailed description taken in conjunction with the appended drawing, in which.

DETAILED DESCRIPTION

Figure 1:
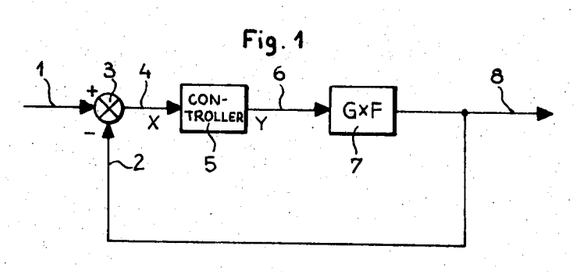
FIG. 1 is a block diagram illustrating a generalized closed-loop regulating system for an industrial process having an internal time delay.

Referring now to the drawing, FIG. 1 shows a block diagram of a feedback control system in which an industrial process represented by the block 7 may be regulated in accordance with a command applied at a terminal 1 of the system. The process 7 may be associated with one of many types of material or energy transfer apparatus such as chemical reactions, distillation columns, cement ovens, industrial boilers, and the like, which exhibit a characteristic time lag between the application of a control signal at a terminal 6 and the output response at a terminal 8.

The type of process considered for this application may be approximated, by mathematical models based on empirical data, to have a transfer function of the general form GXF, where G is an equivalent unretarded transfer function of the form $$\frac{K_0}{(1+pT_0)(1+pT_1)(1+pT_2)},$$

and F is a retardation function of the form $e^{-pto}$. It will be assumed for the following discussions that G may be approximated by the function $K_o/1+pT_o$.

In the feedback system illustrated in FIG. 1, the output of the process 7 is suitably sampled and fed back via a line 2 to one input of a subtracter 3. The command on line 1 is coupled to the outer input. The resulting error signal (designated X) on an output 4 of the subtracter 3 is coupled to an input of a controller 5, which derives a corresponding regulating signal Y for controlling the process.

Under ideal conditions, the use of proportional control together with commonly used integral or differential corrections thereto permits the controller to be adjusted to provide an overall transfer function of the feedback system which yields both good transient and good steady state response. Unfortunately, process time lags of the type described above causes the otherwise properly adjusted systems to become more oscillatory and unstable. Any further attempt to correct such additional instability by lowering the effective gain constant of the main path of the feedback loop will usually adversely affect the static accuracy of the system to an unacceptable degree.

Figure 2:
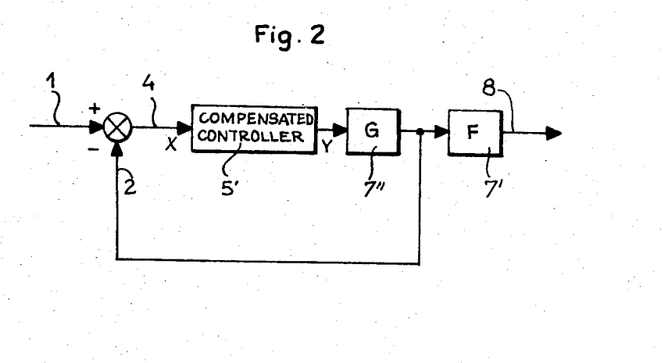
FIG. 2 is a block diagram depicting the elimination of the effect of such time delay on the closed-loop control system of FIG. 1.

In accordance with the invention, the controller is provided with compensating networks for removing the undesired effects of the time delay of the process 7 from the closed feedback loop, so that the additional instability normally caused thereby is eliminated without necessity of sacrificing static accuracy. As shown generally in FIG. 2, the net effect of such compensation is to functionally remove the retardation component F of the process transfer function to a point outside the closed loop so that the transfer function of the main control path is the product of the transfer function of the compensated control (designated 5') and the unretarded process transfer function 7 of the process 7.

Figure 3:
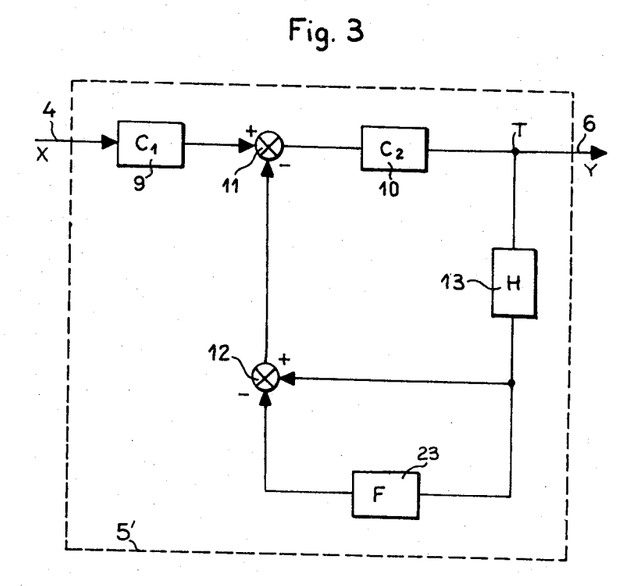
FIG. 3 is a block diagram of a controller constructed in accordance with the invention for eliminating the effect of process time delay in the arrangement of FIG. 1.

A generalized controller design for accomplishing this desired result is shown in FIG. 3. The input error signal on the line 4 is applied through a network 9 having a transfer function $C_1$ to a first input of a subtracter 11. The output of the subtracter 11 is applied through a network 10 having a transfer function $C_2$ to a controller output terminal T to provide the required regulating output signal Y on the line 6.

The terminal T is coupled to the input of a network 13 whose transfer function H is the product of the transfer function $C_1$ of the network 9 and the unretarded transfer function G of the controlled process. The output of the network 13 is applied directly to one input of a second subtracter 12, and through a retardation circuit 23 to a second input of the subtracter 12. The transfer function of the retardation circuit 23 is identical to the retardation portion F of the transfer function of the process. The output of the subtracter 12 is coupled to a second input of the subtracter 11.

Figure 4:
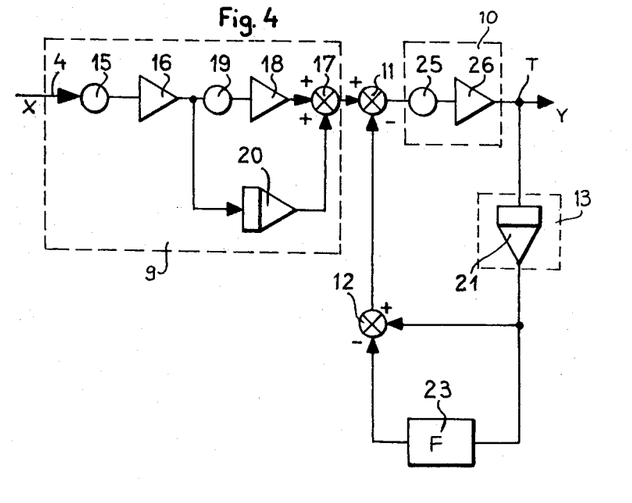
FIG. 4 is a combined block and schematic diagram of a first embodiment of the arrangement of FIG. 3.

One specific manner of instrumenting the controller design of FIG. 3 is shown in FIG. 4. The network 9 has a main path including a pair of potentiometers or other gain-setting devices 15 and 19 alternating with a pair of amplifiers 16 and 18. The output of the amplifier 18 is coupled to one input of an adder 17. A junction of the amplifier 16 and the potentiometer 19 is coupled through an integrator 20 to a second input of the adder 17. The output of the adder 17 is coupled to one input of the subtracter 11.

For purposes of illustration, the potentiometer 15 may be adjusted so that the combined transfer function of the components 15 and 16 is equal to $1/K_o$, and the potentiometer 19 may be adjusted so that the combined transfer function of the components 18 and 19 is unity. Also, the transfer function of the integrator 20 may be adjusted to $1/pT_o$. As a result, the overall transfer function of the network 9 is $$C_1 = \frac{1}{K_0} \frac{(1+1)}{pT_0}.$$

Since the transfer function of the network 13 must be equal to $C_1 \times G$, and since G was assumed above to be of the form $K_o/1pT_o$, the resulting transfer function of the network 13 in FIG. 4 is $1/pT_o$. Thus, the network 13 may be embodied by a suitably adjusted integrator 21.

The network 10, which is embodied in FIG. 4 by a potentiometer 25 and an amplifier 26, may be set to have a suitable line or transfer function Q which yields the required amplitude of the regulating signal Y to properly run the process 7.

Figure 5:
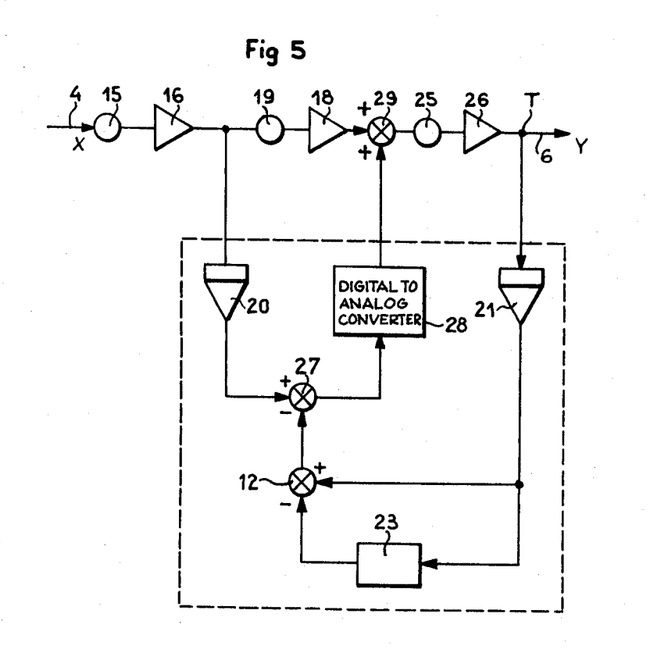
FIG. 5 is a combined block and schematic diagram similar to FIG. 4 but including analog-digital conversion facilities.

It will be evident to those skilled in the art that the analog techniques employed in such types of (In process control loops require components that are relatively heavy and bulky. To help alleviate the weight and bulk problem, a portion be instrumented by digital techniques. FIG. 5 shows a modification of circumstances, the arrangement of FIG. 4 which permits the use of digital techniques in the portion of the circuit shown within dotted lines including an auxiliary subtracter 27. The digital portions of this embodiment conveniently may be instrumented by integrated circuits, thin-film devices, and other lightweight items commonly used for digital processing.

To permit this reduction in size and bulk, the integrators 20 and 21 are provided with suitable analog-to-digital conversion facilities. Additionally, a digital-to-analog converter 28 is interposed between the auxiliary subtracter 27 and an adder 29 in the main path of the loop. (In FIG. 5, it is assumed that the effective transfer function of the converter 28, and the combined transfer function of the potentiometer 19 and the amplifier 18 are both unity.) Under these circumstances, the circuit of FIG. 5 is functionally identical to that of FIG. 4.

Figure 6:
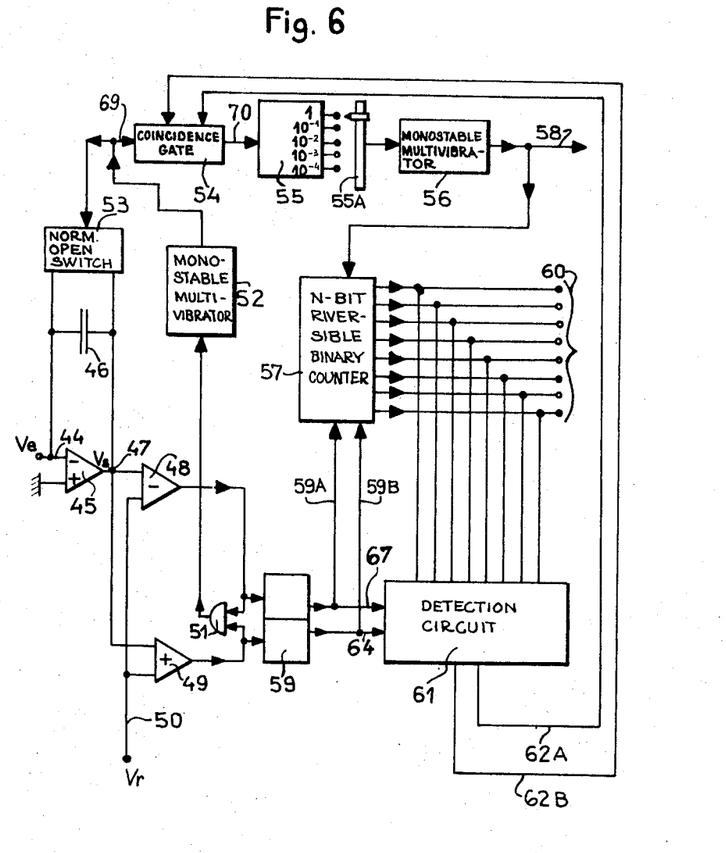
FIG. 6 is a schematic representation of an integrator having analog-digital conversion facilities for use in the arrangement of FIG. 5.

One embodiment of an integrator having analog-digital conversion facilities is shown in FIG. 6. A suitable analog signal $V_e$ (which in a particular case may be the regulating voltage Y at the terminal T) is coupled via an input 44 to one input of an operational amplifier 45, whose remaining input may be grounded. A capacitor 46 is coupled between the input 44 and an output 47 of the amplifier 45, so that an output voltage $V_s$ appearing at the output 47 47 is proportional to the integral of the voltage $V_e$. Since the quantity $V_e$ may be either positive or negative, a pair of comparators 48 and 49 are provided for comparing the voltage $V_s$ with a reference voltage $V_r$ applied via a line 50 to the remaining inputs of the comparators 48 and 49.

The voltage $V_s$, upon reaching the reference value $V_r$, effectively quantized into discrete increments. This is accomplished by means of a monostable multivibrator 52 triggered into operation upon the occurrence of an output pulse from either of the comparators 48 or 49, both of such outputs being steered to the trigger input of the multivibrator 52 by means of an OR-gate 51. The resulting pulse at the output of the multivibrator 52 closes a normally open switch 53, which discharges the integrating capacitor 46. Thus, as soon as the integral of the input voltage $V_e$ reaches a value corresponding to $V_r$, the capacitor 46 is short-circuited for the duration of the resulting multivibrator pulse. At the conclusion of such pulse, the switch 53 is again opened and a new discrete integration interval for the analog voltage $V_e$ can begin. The total number of integration increments of the input voltage $V_e$ is therefore indicated by the number of pulses in the output of the multivibrator 52. The sign of each increment, which determines whether each increment is to be added to or subtracted from a previous increment, is determined by the state of a flip-flop 59 whose complementary inputs are respectively coupled to the output of the comparators 48 and 49 in the manner described below.

The output pulses from the multivibrator 52 are coupled through a coincidence gate 54, normally enabled by binary 1's on lines 62A and 62B respectively, to the input of a decimal divider 55. The output of the divider is selected by means of a switch 55a to conform to one of several scale factors designated 1, $10^{-2}$, $10^{-2}$, etc. Hence, the number of pulses from the multivibrator 52 that get through the gate 54 may be scaled down by selected factors of 10 by the divider 55. Each pulse at the output of the switch 55a is used to trigger a second monostable multivibrator 56, which provides counting pulses to the counting input of an N-bit reversable binary counter 57. (Illustratively, N=8.) The decision logic as to whether each counting pulse applied to the counter 57 should be added to or subtracted from the existing count already there is instrumented by applying the complementary outputs of the flip-flop 59 to first and second control inputs of the counter 57 via lines 59a and 59b. In particular, when the analog voltage at the input $V_e$ is positive, the negative comparator 48 emits a pulse upon the amplitude $V_s$ reaching $V_r$ for enabling the upper input of the flip-flop 59. The resulting output on line 59a causes the counter 57 to count upward until each time that the control inputs are reversed, i.e., until the line 59a is disabled and the line 59b is enabled. This will occur when the input analog voltage $V_e$ changes sign so that the positive comparator 49 will now be triggered upon the voltage $V_s$ reaching $V_r$ to excite the lower input of the flip-flop 59. The counter will then count in a reverse direction until a positive voltage $V_e$ again appears at the input 44. The eight-bit output of the counter 57, appearing on lines 60, will thus represent the net integral of the signal $v_e$ on the line 44.

THe integration constant of the integrator 21 in FIG. 5, when represented by the circuit of FIG. 6, may be adjusted to the proper value $1/T_o$ either through adjustment of the reference voltage $V_r$ or through the appropriate setting of the decimal divider 55.

It will be observed that when the counter 57 has counted upward to its full capacity such that all the bits at the output 60 exhibit a binary 1, a succeeding pulse applied to the counting input in the positive direction will convert all the output bit states to zero. Conversely, when the counter 57 has counted down to zero, the following negative counting pulse will convert all the output bit states to 1. To prevent this, a detection circuit 61 connected to all the output lines of the counter is provided for yielding an output indication on lines 62A and 62B whenever the counter is full in the positive and negative senses, respectively. Each such output indication, illustratively a binary zero, will serve to disable the coincidence gate 54 to disable that gate and prevent the transmissions of a following counting pulse in the same direction.

Figure 7:
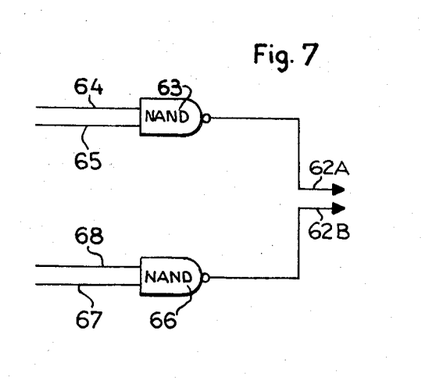
FIG. 7 is a logic diagram of a portion of an overflow detection circuit in the arrangement of FIG. 6.

A portion of the detection circuit 61, which is shown in FIG. 7, includes a pair of NAND-gates 63 and 66 whose outputs energize the lines 62A and 62B, respectively. A first input of the gate 63 is coupled via a line 64 to the lower output of the flip-flop 59 to be enabled thereby when the counter 57 receives a signal to count backwards. A second input 65 of the gate 63 is suitably coupled to the counter 57 for receiving a binary 1 indication whenever a condition of negative saturation, i.e., all 0's at the counter output, is obtained. Similarly, an input 67 of the gate 66 is coupled via a line 67 to the upper terminal of the flip-flop 59 for receiving a binary 1 therefrom whenever the counter is to be advanced. An input 68 of the gate 66 is coupled to the counter 57 for receiving a binary 1 indication when the counter saturates in the positive direction, i.e., with all the outputs showing a binary 1. Hence, the outputs of the gates 63 and 66 are normally in the binary 1 condition necessary to enable the gate 54.

Upon a coincidence in the gate 63 of binary 1 indications on the lines 64 and 65, or upon the coincidence in the gate 66 of binary 1 indications on the lines 67 and 68, binary 0 is generated on the associated output 62A or 62B, which disables the gate 54 and prevents any more counting pulses from passing therethrough until the state of the flip-flip 59 is reversed.

Figure 8:
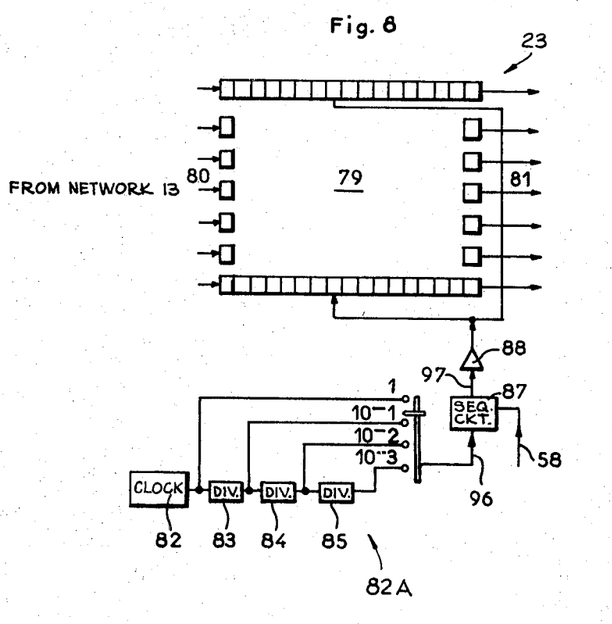
FIG. 8 is a schematic representation of a clock-controlled shift register suitable for use as a retardation circuit in FIG. 5.

FIG. 8 shows schematically a digital embodiment of the retardation circuit 23 of FIG. 5. The 8 outputs of the binary counter 57 are individually applied to the input stages of an eight-bit, 16-stage shift register 79. The adjustment of the required delay of the shift register 79 to correspond to the retardation transfer function F of the process to be controlled may be accomplished by suitably setting the frequency of a clock pulse circuit 82, which provides shifting pulses for the shift register 79. (Such frequency is not synchronized with the counting pulse frequency in FIG. 6.) The clock pulses from the circuit 82 are applied through $a$ a decimal divider 82A including stages 83, 84 and 85 and a selector switch 86; $b$ a sequencing circuit 87 and $c$ an amplifier 88. (The delay of the shift register 79 may also be varied by changing the division factor of the counter 82A.)

Figure 9:
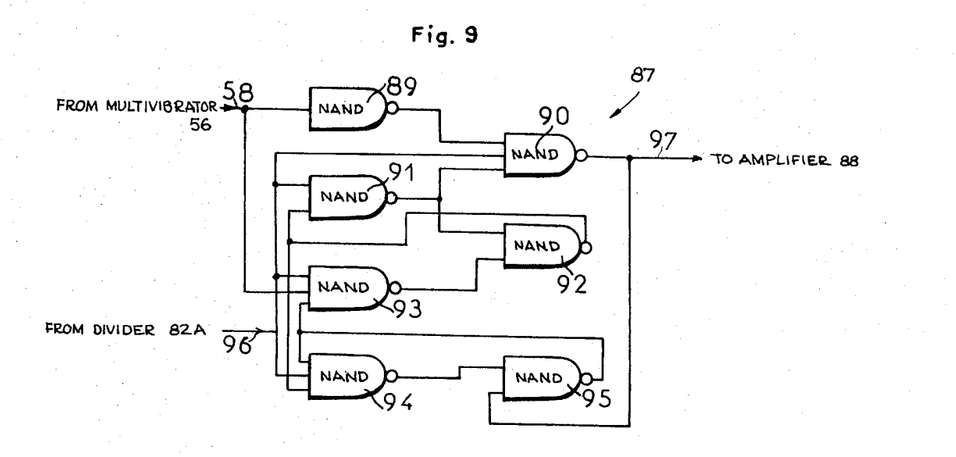
FIG. 9 is a logic diagram of a sequencing circuit suitable for use in the retardation circuit of FIG. 8.

The sequencing circuit 87 operates to prevent the register 79 from shifting during the application of a counting pulse to the counter 57, In particular, the sequencing circuit which may take the form of the logic network of NAND gates shown in FIG. 9, may be of a conventional design that includes seven NAND-gates 89 through 95 with the gates 91 and 92 and the gates 94 and 95 connected as flip-flops.

Figure 10:
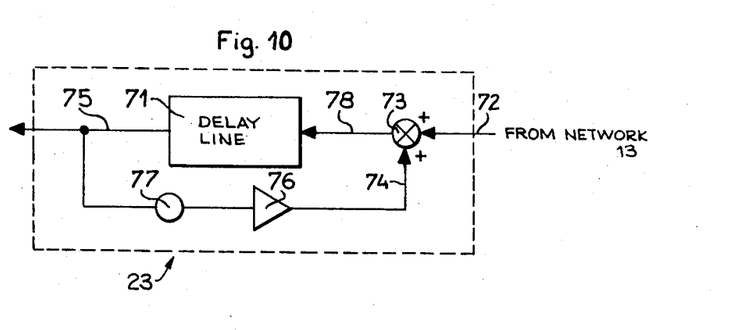
FIG. 10 is a schematic representation of a modified retardation circuit suitable for use in the arrangement of FIG. 5.

A modified form of the retardation circuit 23 is shown in FIG. 10. This circuit may be useful, e.g., where the transfer function F of the effective time lag of the controlled process is not a pure retardation function of the form $e^{-pT}$. A delay line 71 which may be a shift register of the type shown in FIG. 8 when digital techniques are employed, is supplied over a line 78 by the output of an adder 73, a first input of which is connected via a line 72 to the output of the network 13. The output of the shift register 71 is fed back, through a potentiometer 77 and an amplifier 76 having a combined transfer function K, to a second input of the adder 73. Hence the circuit of FIG. 10 is capable of simulating a process retardation function of the general form $e^{-pt}/+Ke^{-pt}$.

Figure 11:
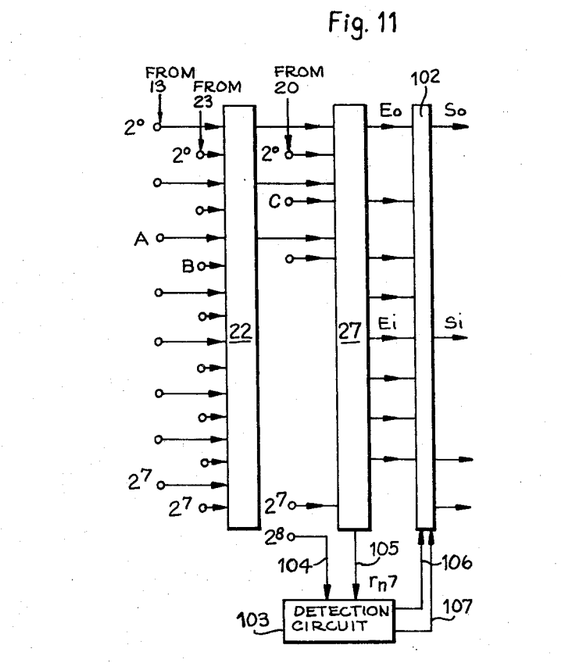
FIG. 11 is a block diagram illustrating a pair of subtracters having overflow detection facilities, such subtracters being suitable for employment in the digital portion of the arrangement of FIG. 5.
Figure 12:
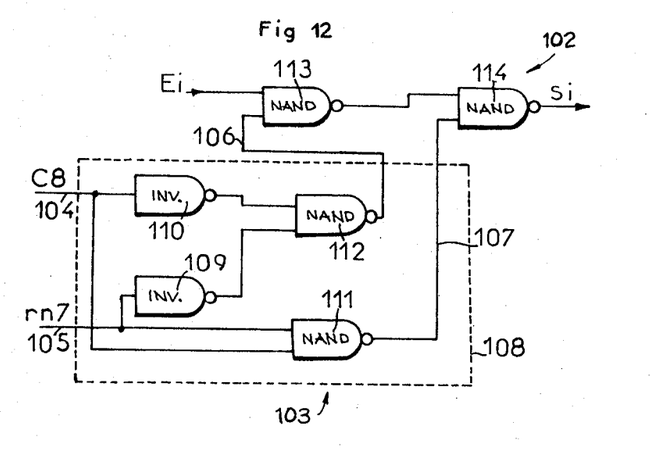
FIG. 12 is a logic diagram of the overflow detection facilities in the arrangement of FIG. 11.

The subtractors 11 and 27, which may take the form of conventional N-bit binary devices, are shown in FIG. 11, together with an overflow detection circuit 103 associated with the output of the subtracter 27 for detecting both positive and negative overflows. A network 102 responsive to the detection circuit 103 sets all the digits at the output of the subtracter 27 at the binary value 1 if the overflow from the subtracter 27 is negative, and at the value 0 if the overflow from such subtracter is positive. To accomplish this, the binary state of the highest order digit in the output from the integrator 20 is compared with the binary value of the carry digit in the highest order of the subtracter 27. As shown in FIG. 12, this may be done with an arrangement of inverters 109 and 110 and NAND-gates 111 and 112. In particular, the highest order digit $C_8$ at the output of the integrator 20 is applied via line 104 to the input of the inverter 110 and to one input of the gate 111. The highest order carry digit $r_7$ from the subtracter 27 is coupled via line 105 to the input of the inverter 109 and the outer input of the gate 111. The gate 112 has its inputs respectively connected to the outputs of the inverters 109 and 110.

The outputs of the gates 111 and 112 respectfully generate indications of negative and positive overflow from the subtracter 27. The negative and The negative overflow indication is coupled via a line 107 to one input of an associated one of digit NAND-gates 114 in the circuit 102, only one of which is shown. The positive indication is coupled via a line 106 to one input of each of eight NAND gates in the circuit 102, only one of such gates being shown. The output of the gate 113 is applied to the other input of an associated one of eight NAND-gates 114 only one of which is shown. Each of the eight digits $E_i$ on the output of the subtracter 27 is applied to the other input of an associated one of the gates 113.

With the arrangement shown, the circuit 102 operates in such a manner that in the absence of either a positive or negative overflow pulse from the circuit 103, each digit $E_i$ applied to the circuit 102 emerges from the gate 114 when its digit value $S_i$ is unchanged. In the presence of a positive overflow indication, the corresponding digit $S_i$ emerging from the gate 114 is zero irrespective of the state of the incoming digit $E_i$. In the presence of a negative indication, the state of the digit $S_i$ at the output of the gate 114 will be 1 irrespective of the state of the input digit $E_i$.

Figure 13:
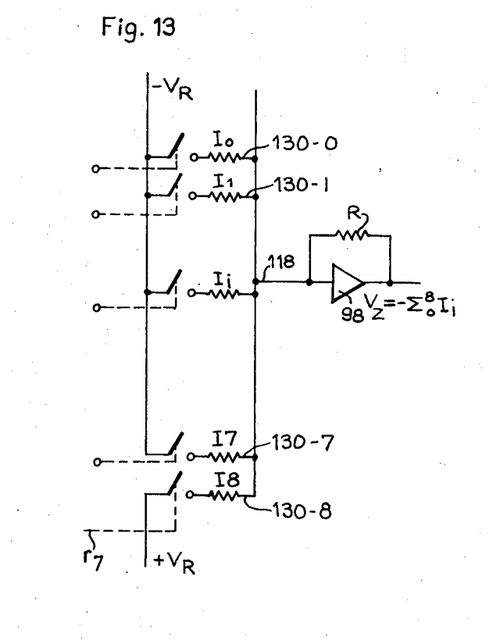
FIG. 13 is a schematic representation of a digital-to-analog converter suitable for use in the arrangement of FIG. 5.

FIG. 13 illustrates a typical form of N-bit digital-to-analog converter which may be employed for the block 28 of FIG. 5. The inputs of the converter, when in the binary 1 state, individually actuate N switches disposed in eight parallel resistive paths 130-0 to 130-7 (FIG. 13) each supplied from a source $V_r$ and having a resistance that decreases in a binary manner from the uppermost path 130-0 through the path 130-7. Consequently, the associated currents $I_i$ in the paths increase in a binary manner, and the resultant voltage at a junction 118 at the output of the paths has an amplitude proportional to the numerical weight of the eight digit inputs at the input of the paths. The voltage at the junction 118 is linearly amplified in an amplifier 98 which is shunted by a resistance R.

In the case where the converter of FIG. 12 is coupled to a subtracter (e.g., the subtracter 27) whose output may go negative (as evidenced by the presence of a binary 1 on the carry output $r_7$ of the subtracter), an additional resistive path 130-8 is provided whose output is connected to the terminal 118 and whose input is connected to a source of voltage $+V_r$. Hence, in the presence of a negative output form the subtracter, the switch associated with the path 130-8 is closed to suitably modify the output analog voltage on the junction 118.

Figure 14:
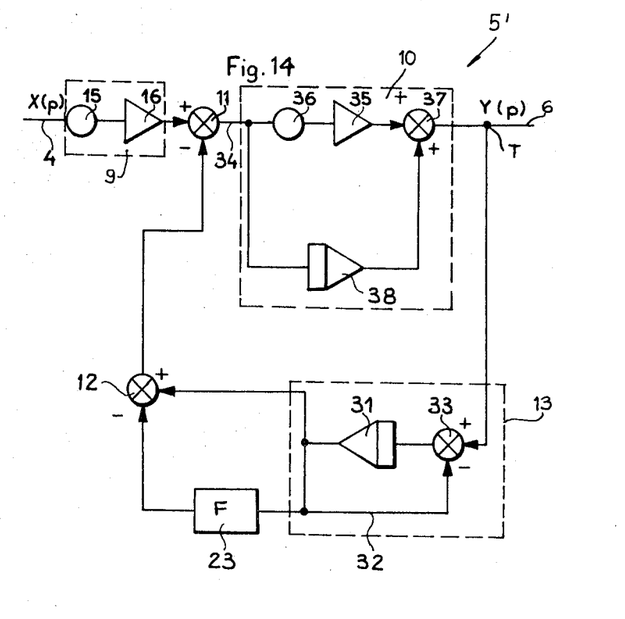
FIG. 14 is a combined block and schematic diagram of a second embodiment of the arrangement of FIG. 3.

Referring now to FIg. 14, there is shown an alternative embodiment of the controller of FIG. 3 for providing the required time delay compensation for the process to be controlled. In this case the network 9 includes a potentiometer 15 and an amplifier 16 which are adjusted to have a combined transfer function $1K_0$. The network 10 at the output of the subtracter 11 has two parallel branches, one containing a potentiometer 36 and an amplifier 35 whose combined transfer function may be set to the value Q, while the second branch includes an integrator 38 having a transfer function $QpT_o$. The output of the amplifier 35 and the output of the integrator 38 are applied to respective inputs of an adder 37, whose output is coupled to the terminal T. Hence, the transfer function of the network 10 is equal to $Q[1 + 1/pT_o]$.

The network 13 of FIG. 14 includes an integrator 31 having a transfer function $1pT_o$. The integrator 31 is coupled to the output of a subtracter 33. One input of the subtracter 33 is connected to the terminal T while the other input of the subtracter 33 receives a feedback signal from the integrator 31 via a line 32. The resulting transfer function of the network 13 is therefore $1(1 + pT_o)$. The remainder of the circuit of FIG. 14 is identical to that of FIG. 4.

Figure 15:
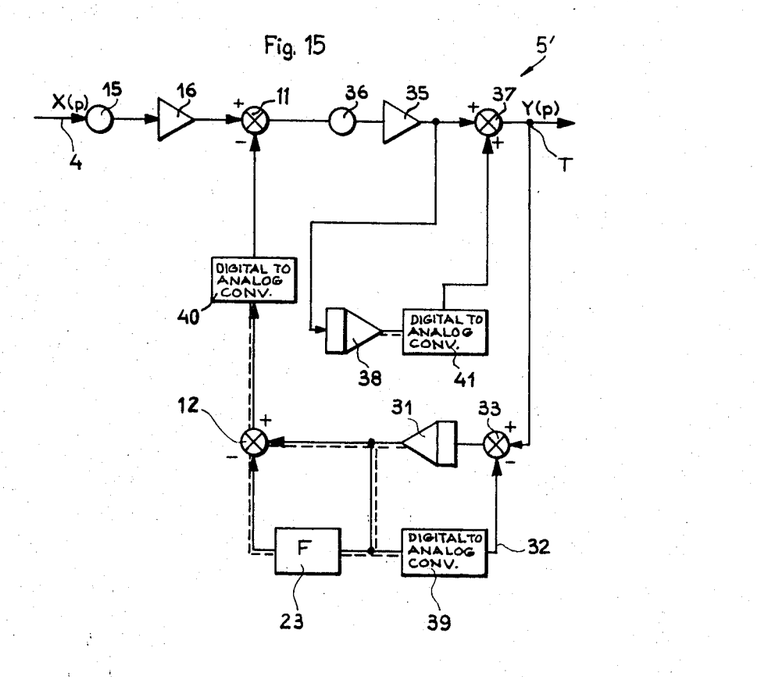
FIG. 15 is a combined block and schematic diagram similar to FIG. 14 but including analog-digital conversion facilities.

FIG. 15 is a modification of FIG. 14 which includes analog-digital conversion facilities. Thus, the integrators 31 and 38 may take the form shown in FIG. 6. The subtracter 11 and the retardation circuit 23 are digital components. Digital-to-analog converters, which may be similar to that shown in FIG. 13, are coupled to the outputs of the integrators 31 and 38 and the subtracter 11. Functionally, the arrangement of FIG. 15 is similar to that of FIG. 14.

Figure 16:
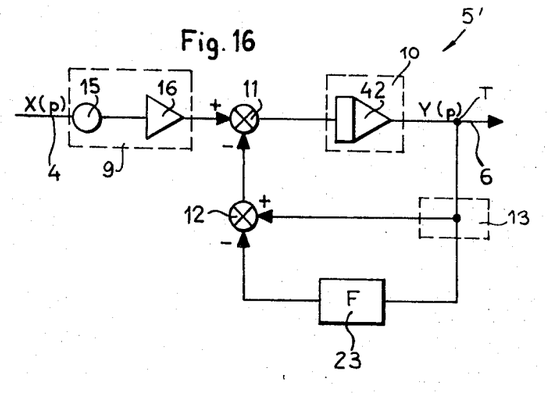
FIG. 16 is a combined block and schematic diagram of a third embodiment of the arrangement of FIG. 3.
Figure 17:
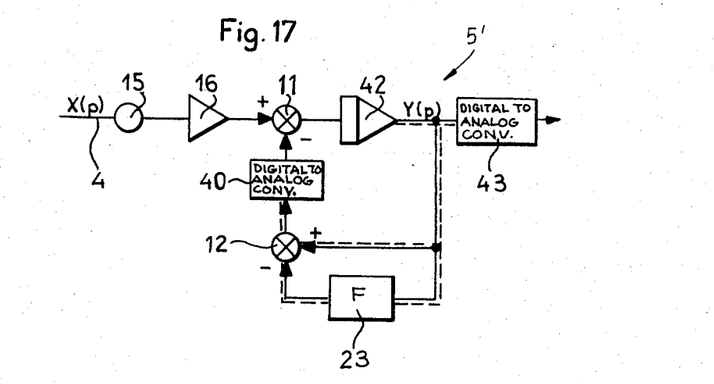
FIG. 17 is a combined block and schematic diagram similar to FIG. 16 but including analog-digital conversion facilities.

A simplified version of the arrangement of FIGS. 14 and 15 is shown in FIGS. 16 and 17. The latter differ from each other only in the fact that FIG. 16 is analog in form while FIG. 17 is part analog and part digital. In FIG. 16, the network 9 includes a potentiometer 15 and an amplifier 16 having a combined transfer function $1K_o$. The network 10 includes an integrator 42 having a transfer function $QpT_o$. The network 13 takes the form of a direct electrical connection having a unity transfer function between the terminal T and the associated input of the subtracter 11.

FIG. 17 which is functionally the same as FIG. 16 includes (1) analog-to-digital conversion facilities in the integrator 42; (2) digital arrangements in the subtracter 11 and retardation circuits 23; and (3) digital-to-analog converters 40 and 43.

It is to be understood that the above-described embodiments are merely illustrative of the principles of the invention. Numerous other modifications will now suggest themselves to those skilled in the art. Such modifications may obviously be devised without departing from the spirit and scope of the invention.

What is claimed is:

1. In a closed-loop control system including a controller regulating a time-retarded process having an effective transfer function F×G, where G represents an equivalent unretarded transfer function of the process and F represents the retardation factor, an improved controller arrangement for eliminating the effect of process time delay from the closed-loop system, which comprises:
   first and second subtracting means each having first and second inputs;
   a first network for coupling the input terminal of the controller to a first input of the first subtracting means; means;
   a second network having a transfer function equal to the product of G and the transfer function of the first network for coupling the output terminal of the controller to the first input of the second subtracting means;
   a retardation circuit having the transfer function F for coupling the output of the second network to the second input of the second subtracting means;
   means for applying the output of the second subtracting means to the second input of the first subtracting means; and
   means for transferring the output of the first subtracting means to the output terminal of the controller.

2. A system as defined in claim 1, in which the transfer function G is of the form $K_o(1+pT_o)$, and in which the first network comprises, in combination, means for generating a first signal proportional by a factor $1K_o$ to a signal appearing at the controller input terminal;
   means for generating a second signal proportional by a factor $1K_oT_o$ to the integral of a signal appearing at the controller input terminal;
   means for adding the first and second signals; and
   means for applying the output of the adding means to the first input of the first subtracting means.

3. A system as defined in claim 2, in which the second network comprises means for generating a third signal proportional by a factor $1/pT_0$ to a signal appearing at the controller output terminal.

4. A system as defined in claim 3, in which the transferring means comprises means for generating a fourth signal proportional to the output of the first subtracting means.

5. A system as defined in claim 1, in which the transfer function G is of the form $K_o(1+pT_o)$; the first network comprises means for generating a first signal proportional by a factor $1K_o$ to a signal appearing at the controller input terminal the second network has a unity transfer function; and the transferring means comprises, in combination, means for generating a second signal proportional by a factor $QpT_o$ to the output of the first subtracting means, and means for coupling the second signal generating means to the controller output terminal.

6. A system as defined in claim 1, in which the second network includes analog-to-digital conversion means.

7. A system as defined in claim 6, in which the conversion means comprises, in combination, means for transforming an analog input signal applied thereto to a representative succession of pulses; an N-bit reversible binary counter having a counting input and first and second control inputs, the individual excitation of the first and second control inputs causing a pulse applied to the counting input from the transforming means to respectively increase and decrease the count; and switching means coupled to the output of the transforming means and operative for energizing the first control input when the analog input signal is of one sign and for energizing the second control input when the analog input signal is of the opposite sign.

8. A system as defined in claim 7, further comprising means rendered effective when the counter reaches saturation in one of two opposite directions for inhibiting the application of counting pulses thereto until the occurrence of a succeeding operation of the switching means.

9. A system as defined in claim 7, in which the retardation circuit comprises a clock-controlled shift register, and means for inhibiting the advance of the shift register by the clock during the application of a pulse to the counting input of the counter.

10. A system as defined in claim 7, in which the second subtracting means is an N-bit binary device, and in which the system further comprises means individually rendered effective upon a positive and a negative overflow of the device for setting all the digits at the device output in first and second binary states, respectively.

11. In a closed-loop control system including a controller for regulating a time-retarded process having an effective transfer function that includes a delay factor F, an improved controller arrangement for eliminating the effect of process time delay from the closed-loop system, which comprises:
   first and second subtracting means each having first and second inputs;
   a first network for coupling the input terminal of the controller to a first input of the first subtracting means;
   a second network for coupling the output terminal of the controller to the first input of the second subtracting means;
   a delay circuit having the transfer function F for coupling the output of the second network to the second input of the second subtracting means;
   means for applying the output of the second subtracting means to the second input of the first subtracting means; and
   means for transferring the output of the first subtracting means to the output terminal of the controller.